Patented June 12, 1923.

1,458,693

UNITED STATES PATENT OFFICE.

WILLIAM FELDENHEIMER, OF LONDON, WALTER WILLIAM PLOWMAN, OF EAST SHEEN, AND PHILIP SCHIDROWITZ, OF LONDON, ENGLAND.

MANUFACTURE OF RUBBER.

No Drawing. Application filed August 12, 1921. Serial No. 491,829.

*To all whom it may concern:*

Be it known that we, WILLIAM FELDENHEIMER, WALTER WILLIAM PLOWMAN and PHILIP SCHIDROWITZ, subjects of the King of England, residing at London, England, East Sheen, Surrey, England; and London, England, have invented certain new and useful Improvements in the Manufacture of Rubber, of which the following is a specification.

The present invention is for improvements in or relating to the manufacture of rubber, and concerns the production of rubber compositions containing clay.

According to this invention, a process for the manufacture of rubber compositions containing clay is characterized by the addition to the rubber mixture of a watersoluble soap in the dry state, for example, an alkali oleate, or the equivalent of a watersoluble soap, for example, an alkali and an acid or acids capable of yielding a soap. The term water-soluble soap as hereinafter employed includes such equivalents.

In conjunction with the soap an alkali, for example, anhydrous sodium carbonate, may be added in the dry state to the rubber mixture.

Prior to addition to the rubber mixture, the soap or the alkali or both may be incorporated in the dry state with the clay or a part thereof.

The clay may be prepared from any suitable natural clay by washing and sedimentation or other process which is adapted to give a pure product, but preferably the clay utilized is one which has been prepared by aid of peptisation (deflocculation).

By peptisation is meant the dispersion of the clay in a fluid medium by addition of an appropriate quantity of a peptising (deflocculating) reagent, for example, ammonia, sodium hydrate, or sodium carbonate. The clay substance is then recovered from the dispersion in any known way. Clay the preparation of which has involved treatment of this kind is hereinafter referred to as colloidal clay. For example, clay which has been submitted to the processes set forth in Feldenheimer's specification of British Letters Patent No. 106,890, or No. 121,191 (United States Patent No. 1324958) may be used.

The following examples will serve to indicate two modes of procedure according to this invention, is being understood that these examples are given for illustrative purposes and not by way of limitation.

Example I.

To a china-clay prepared according to the United States Patent No. 1324958, there was added an intimate admixture of anhydrous sodium carbonate and sodium oleate in such proportion as to give a material containing 3 per cent of the carbonate and 3 per cent of the soap, and the three substances were thoroughly incorporated by grinding. The so treated clay was then added to the rubber mixture, the relative proportions of the ingredients according to this example being as follows:—

| | Parts. |
|---|---|
| Rubber | 57 |
| Treated clay | 40 |
| Sulphur | 3 |

This mixture on vulcanziation at 40 lbs. pressure gave a correctly cured composition in about 45 minutes.

Example II.

The mixture had the following composition:

| | Parts. |
|---|---|
| Rubber | 228 |
| Colloidal clay | 151 |
| Sodium carbonate (anhydrous) | 4.5 |
| Oleic acid | 4.5 |
| Sulphur | 12 |

The colloidal clay was clay prepared according to the aforesaid Patent No. 1,324,958.

The sodium carbonate was intimately admixed with the clay by grinding the two together, the treated clay was introduced into the mixer and the ingredients were then incorporated together, the oleic acid being added drop by drop during the process of mastication.

On vulcanization at 40 lbs. pressure this mixture was fully cured in from 60–75 minutes.

The proportion relatively to the clay of the soap constituent of the mixture may be varied as required, a preliminary trial serving to determine this factor in a given case, for example, according to the constitution of the mixture or the nature of the rubber composition desired. As a guide, it may be said that relative proportions of the order set forth in the above examples are those which have been found to give good combined results, decreasing the relative proportion of the soap constitutent tending to increase the time of cure, while as the proportion is augmented the rate of the cure generally rises, and if the relative quantity of this constituent be too high the rate of curing may be increased at the expense of the physical properties of the final composition.

By the manufacture of rubber compositions according to this invention, products are obtainable of high breaking strain and good distensibility, which both by their appearance and physical properties are adaptable for various technical applications.

What we claim as our invention and desire to secure by Letters Patent is:—

1. The process for the manufacture of rubber compositions which comprises the incorporation of clay in conjunction with a saponaceous material in the dry state with a rubber mixture.

2. The process for the manufacture of rubber compositions which comprises the incorporation of colloidal clay in conjunction with a saponaceous material in the dry state with a rubber mixture.

3. The process for the manufacture of rubber compositions which comprises the incorporation of colloidal clay in conjunction with an alkaline saponaceous material in the dry state with a rubber mixture.

4. The process for the manufacture of rubber compositions which comprises the incorporation of colloidal clay in conjunction with an alkali soap in the dry state with a rubber mixture.

5. The process for the manufacture of rubber compositions which comprises the incorporation of colloidal clay in conjunction with an alkali oleate in the dry state with a rubber mixture.

6. The process for the manufacture of rubber compositions which comprises the incorporation of colloidal clay in conjunction with an alkali and an alkali oleate in the dry state with a rubber mixture.

7. The process for the manufacture of rubber compositions which comprises incorporating colloidal clay with an alkali and an alkali oleate in the dry state, then incorporating the product with a rubber mixture, and vulcanizing the mass.

8. The process for the manufacture of a rubber composition which comprises compounding clay and a saponaceous substance with a vulcanizable mixture of unvulcanized rubber, and vulcanizing the mass.

9. The process for the manufacture of a rubber composition which comprises compounding clay and a substantially dry saponaceous substance with a vulcanizable mixture of unvulcanized rubber, and vulcanizing the mass.

10. The process for the manufacture of a rubber composition which comprises compounding colloidal clay and a substantially dry saponaceous substance with a vulcanizable mixture of unvulcanized rubber, and vulcanizing the mass.

11. The process for the manufacture of a rubber composition which comprises compounding colloidal clay and a substantially dry alkaline saponaceous substance with a vulcanizable mixture of unvulcanized rubber, and vulcanizing the mass.

12. The process for the manufacture of a rubber composition which comprises compounding colloidal clay and a substantially dry salt of a fat-derived acid and an alkaline base with a vulcanizable mixture of unvulcanized rubber, and vulcanizing the mass.

13. The process for the manufacture of a rubber composition which comprises compounding colloidal clay and a substantially dry alkaline oleate with a vulcanizable mixture of unvulcanized rubber, and vulcanizing the mass.

14. The process for the manufacture of a rubber composition which comprises compounding colloidal clay and a substantially dry alkaline oleate and alkali with a vulcanizable mixture of unvulcanized rubber, and vulcanizing the mass.

15. The process for the manufacture of a rubber composition which comprises compounding colloidal clay and substantially dry sodium oleate with a vulcanizable mixture of unvulcanized rubber, and vulcanizing the mass.

16. The process for the manufacture of a rubber composition which comprises compounding colloidal clay and substantially dry sodium oleate and carbonate with a vulcanizable mixture of unvulcanized rubber, and vulcanizing the mass.

In testimony whereof we have signed our names to the specification.

WILLIAM FELDENHEIMER.
WALTER WILLIAM PLOWMAN.
PHILIP SCHIDROWITZ.